J. F. GYLES.
Improvement in Machines for Preparing Lumber for Building Purposes.

No. 128,388. Patented June 25, 1872.

Witnesses:
G. Mathys.
Geo. C. Lemon.

Inventor:
James F. Gyles
Per ——
Attorneys.

2 Sheets--Sheet 2.
J. F. GYLES.
Improvement in Machines for Preparing Lumber for Building Purposes.
No. 128,388. Patented June 25, 1872.
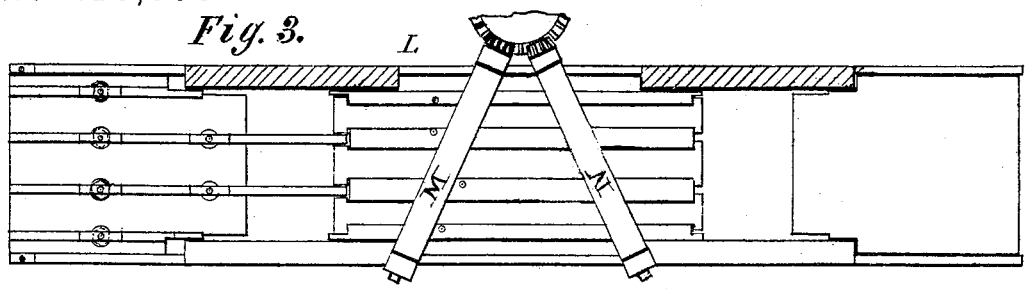
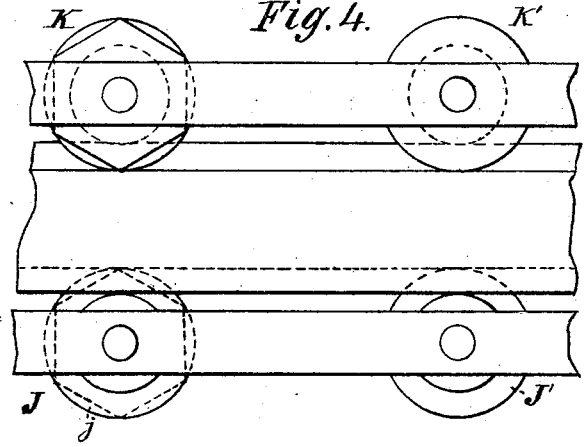
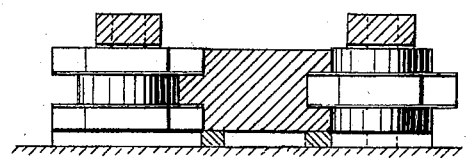
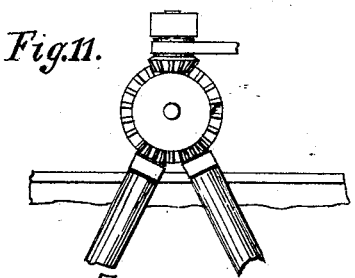
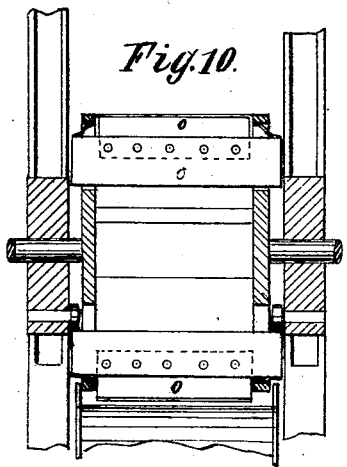
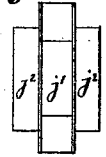
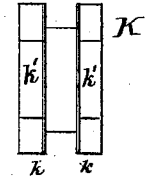
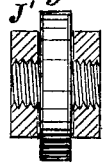
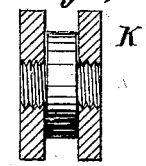
Witnesses:
G. Matthys.
Solon C. Kemon
Inventor:
James F. Gyles
Per Kemon & Co.
Attorneys.
AM. PHOTO-LITHOGRAPHIC CO. N.Y. (OSBORNE'S PROCESS.)

No. 128,388

UNITED STATES PATENT OFFICE.

JAMES F. GYLES, OF CHICAGO, ILLINOIS.

IMPROVEMENT IN MACHINES FOR PREPARING LUMBER FOR BUILDING PURPOSES.

Specification forming part of Letters Patent No. 128,388, dated June 25, 1872.

Specification describing a Machine for Desiccating and Preparing Lumber for Building Purposes, invented by JAMES F. GYLES, of Chicago, in the county of Cook and State of Illinois.

The invention consists in a peculiar mode of constructing and combining tools and machinery for grooving, tonguing, desiccating, and cutting lumber into lengths, all as hereinafter fully described and subsequently pointed out in the claim.

Figure 1:
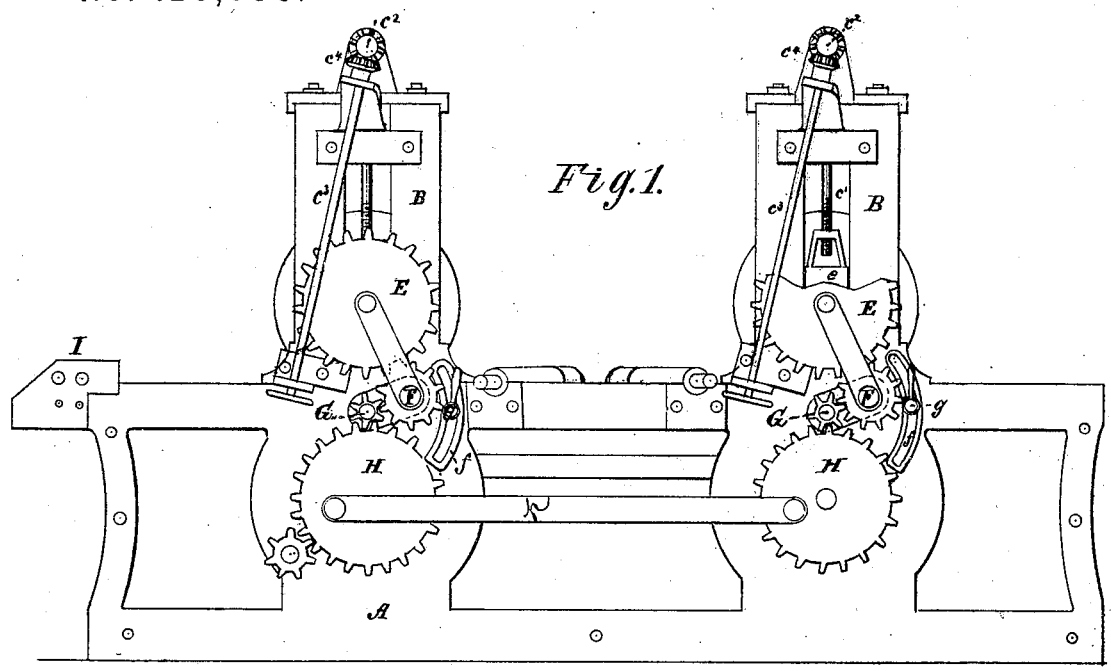
Figure 2:
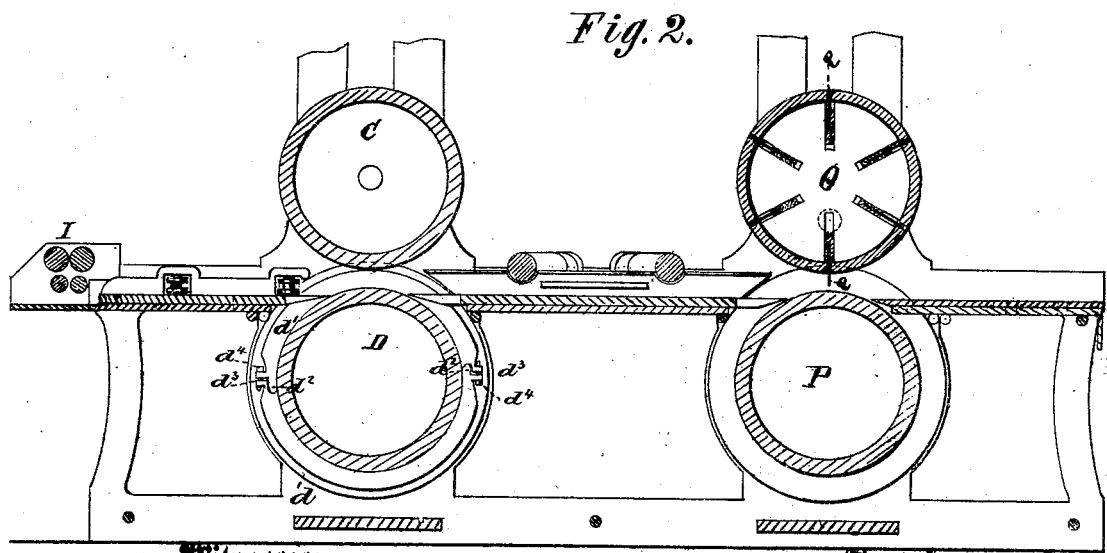

Figure 1 is a side elevation of my machine; Fig. 2, a longitudinal section; Fig. 3, a plan view of table and smoothing-rolls. Fig. 4 is an enlarged plan view of grooving and tonguing tools; Figs. 6, 7, 8, and 9, detail views of same. Fig. 10 is a transverse section of Fig. 1, showing the cutting-roll and its knives. Fig. 11 is a detail view of mechanism for operating the emery-rolls.

A represents the frame of the machine, provided with standard B. C D are two desiccating or pressure rolls of which the upper, C, is placed in adjustable bearings $c$. These bearings are moved by screws $c^1 c^1$ having bevel-wheels which connect with corresponding wheels on a shaft, $c^2$, that is rotated by the hand-shaft $c^3$. The lower roll D has end flanges $d\, d$ within which the upper roll works, and intermediate ribs $d^1$, by which the lumber is compelled to move exactly in the direction desired. These ribs $d^1$ are made in two parts and provided with tongue and groove $d^2$ and flanges $d^3$, by which they can not only be fastened detachably by screws $d^4$, but can be readily drawn more tightly when they become loose. The rolls C D are connected on each side by gearing E F G H, which admits of the adjustment of the upper roll. $f$ is a pivoted and slotted hanger which is held by a clamp-screw, $g$. At I are located ordinary feed-rolls, by which the lumber is pushed forward into rolls C D, while between the feed and pressure rolls are placed the rotary grooving and tonguing tools J J$^1$ and K K$^1$. Each grooving-tool J consists of two particular cutters, $j\, j$, and a polygonal indenter and compresser, $j^1$, clamped between two guide-rolls, $j^2 j^2$, while the corresponding tonguing-tool K differs only in having two polygonal pieces, $k^1 k^1$, a central guide-roll, $k^2$. The second grooving-tool J$^1$ consists of two outside rolls and a large central roll, which, together, compress, smooth, and even the work previously done by tool J, while the second tonguing-tool K$^1$ consists of two large and one smaller central roll, for the same purpose. L is the table on which the timber emerges from the pressure-rolls, and which contains the emery-rolls M N, placed obliquely thereto and at an opposite angle to the axes of pressure-rolls. O P are the cutting-rolls, the first having the series of knives Q arranged across the periphery. These are made to protrude by a rotary cam and drawn back by springs, or in any equivalent way. These rolls are geared and adjusted like rolls C D, and may be connected with them by a crank-pitman, $p$.

The operation is as follows: The green lumber is entered between the feed-rolls which, being set in motion, force it forward. The rotary knives $j$ then cut the fiber to the depth required, and the polygonal pieces compress and form indentations in the wood, while the tools J$^1$ K$^1$ compress, smooth, and even the groove and tongue into the shape required. The lumber is now passed between the desiccating-rolls C D, which express a greater portion of the twenty-five per cent. of moisture that is usually found in green lumber. The lumber now passes under the polishing and smoothing rolls M N that move in opposite directions and act on the material diagonally. The lumber then passes on to the cutting-rolls O P which divide it into such lengths as may have been previously determined upon. The usual method of desiccating the lumber by steam has the effect only to eliminate the moisture to a certain distance beneath the surface and leave the heart or inner part subject to decay, while mine expresses it equally and longitudinally with the grain of the fiber; the steam process contracts the fibers and lessens all the dimensions of the material, while my process merely diminishes the thickness while it correspondingly widens the lumber. And at the same time my process closes the pores and hardens the material so that it cannot readily imbibe moisture when exposed to it, neither will it shrink or warp when manufactured, but becomes at once seasoned and fit for all the purposes of manufacture.

Having thus described my invention, what I claim as new, and desire to secure by Letters Patent, is—

1. The tools J J¹ and K K¹, constructed and operating as described, for making a tongue and groove, or rabbet.

2. The combination of tools J J¹ and K K¹ with rolls C D having flanges $d$ and ribs $d^1$, as and for the purpose set forth.

3. The combination, in the same machine, of tools J J¹ and K K¹ and rolls C D, with obliquely-placed and oppositely-revolved smoothing-rolls M N, as and for the purpose described.

4. The combination, in the same machine, of the tonguing, grooving, or rabbeting tools, the rolls C D, and the smoothing-rolls M N with the cutting-rolls O P, as and for the purpose described.

5. The annular band or rib $d^1$, made in two sections having tongue and groove $d^2$, and flanges $d^3$, to adapt them to be applied, as and for the purpose set forth.

JAMES F. GYLES.

Witnesses:
SOLON C. KEMON,
THOS. D. D. OURAND.